United States Patent [19]

Mattox

[11] 4,018,881

[45] Apr. 19, 1977

[54] HIGH SURFACE AREA ALUMINA AND METHOD FOR THE PREPARATION THEREOF

[75] Inventor: William J. Mattox, Baton Rouge, La.

[73] Assignee: Exxon Research and Engineering Company, Linden, N.J.

[22] Filed: Jan. 15, 1975

[21] Appl. No.: 541,278

Related U.S. Application Data

[62] Division of Ser. No. 163,045, July 15, 1971, abandoned.

[52] U.S. Cl. .............................. 423/631; 252/463
[51] Int. Cl.² .................... C01F 7/02; B01J 23/08
[58] Field of Search ........... 423/628, 631: 252/463, 252/455 Z

[56] References Cited

UNITED STATES PATENTS

| | | | |
|---|---|---|---|
| 2,737,444 | 3/1956 | Fisher et al. | 423/631 |
| 2,888,323 | 5/1959 | Teichner | 423/631 X |
| 2,914,488 | 11/1959 | Gilbert | 423/628 X |
| 3,188,174 | 6/1965 | Kehl et al. | 423/631 |

*Primary Examiner*—Carl F. Dees
*Attorney, Agent, or Firm*—Roy J. Ott

[57] ABSTRACT

A high surface area alumina is provided exhibiting a surface area ranging from about 350 to about 550 meters²/gram.

The high surface area alumina is prepared by reacting substantially anhydrous aluminum chloride with ammonia at temperatures ranging from about 100° to about 900° F. to form an aluminum chloride-ammonia complex comprising aluminum chloride polyammoniates, and hydrolyzing said polyammoniates to obtain high surface area alumina.

5 Claims, No Drawings

HIGH SURFACE AREA ALUMINA AND METHOD FOR THE PREPARATION THEREOF

This is a division, of application Ser. No. 163,045, filed July 15, 1971, now abandoned.

This invention relates to particularly high surface area aluminas and to methods for the preparation thereof. More particularly, this invention relates to high surface area aluminas useful in alumina-containing hydrocarbon conversion catalysts and to highly efficient methods for the preparation thereof.

Alumina is a well known component of hydrocarbon conversion catalysts. Alumina is employed as a catalyst component in a variety of capacities. For example, it can comprise either a major or a minor proportion of the catalyst and can serve as the principal catalytic material or as a supporting base or conjunct component for more active or activating additives usually present in minor amounts. Alumina-containing catalysts are useful in a wide variety of conversion reactions applicable to organic compounds and especially to hydrocarbons and hydrocarbon derivatives. Examples of such conversion reactions are oxidation, hydration, dehydration, hydrogenation, dehydrogenation, aromatization, cracking, hydrocracking, alkalation, dealkalation, isomerization, polymerization, desulfurization, denitrogenation and the like. In all of these conversion reactions, the role of alumina in the catalyst is well known. Alumina can be used in conjunction with various additives or activating materials to form catalysts which are specific for particular conversion reactions.

Since catalysis is at least in part a surface phenomenon it is desirable to employ catalyst materials exhibiting high surface areas. In composite catalysts, such as silica-alumina-magnesia or silica-alumina, high total surface areas have been obtained primarily due to the silica present therein.

Accordingly, it is an object of the present invention to provide a high surface area alumina particularly useful as a catalyst material or component.

It is another object of the present invention to provide a process for preparing high surface area alumina.

These as well as other objects are accomplished by the present invention which provides a high surface area alumina exhibiting a surface area ranging from about 350 to about 550 meters$^2$/ gram.

In another embodiment, the present invention provides a process for preparing high surface area aluminas comprising reacting substantially anhydrous aluminum chloride with ammonia at temperatures ranging from about 100° to 900° F. to form an aluminum chloride-ammonia complex comprising aluminum chloride polyammoniates and hydrolyzing said ammoniates to obtain high surface area alumina.

The high surface area aluminas of the present invention are especially suitable for use as catalyst components and can be readily prepared in excellent yields by the decomposition and hydrolysis of aluminum chloride-ammonia complexes. These complexes form at a relatively low temperature, generally in the range of from about 100° to about 900° F. Under these conditions, however, higher ammoniates are also formed which may contain 8 or 9 moles of $NH_3$ per mole $AlCl_3$ and which must be converted to ammoniates in the range of about 3 to 6 moles $AlCl_3$ preceeding hydrolysis to alumina ($Al_2O_3$). Conversion to these intermediate ammoniates is readily accomplished by slowly heating any polyammoniates contained in the aluminum chloride-ammonia complex to temperatures of from about 500° to about 900° F. If desired, the aluminum chloride-ammonia complex can be purified by vacuum distillation, sublimation, or the like thereby permitting preparation of the complex from impure aluminum chloride. Upon hydrolysis, the resulting alumina can be recovered by filtration and washing to remove any residual chloride ions. Thereafter, the alumina can be dried.

It has been found that even greater surface area is imparted to the alumina by hydrolyzing the ammoniates in a hydrolysis solution exhibiting a basic pH, and preferably a pH of at least about 9. The pH can be regulated by adding a base to the solution and, if desired, the solution can be buffered. Thus, for example, $NH_4OH$ or other bases can be added to the hydrolysis solution to maintain the pH at 9 or above. Advantageously, a buffered solution can be prepared employing $NH_4OH$ and ammonium acetate or other similar buffers.

Alumina prepared in accordance with the present invention has been found to exhibit significantly higher surface area than aluminas previously available. Generally, the aluminas of the present invention exhibit surface areas ranging from about 300 to about 550 meters$^2$/gram after calcination.

The high surface area aluminas of the present invention can be employed in a wide variety of catalytic hydrocarbon conversion processes either alone or composited with other catalytic materials, additives or promoters. For example, the aluminas of the present invention can be employed in hydrogenation or dehydrogenation reactions such as, for example in catalytic reforming, powerforming and the like in conjunction with platinum and/or molybdena. Hydrogenation or dehydrogenation of multiple carbon-carbon bonds can be accomplished with the alumina catalysts of the present invention composited with chromia, molybdena, palladia, iron oxide, calcium-nickel phosphates and the like. Hydrogenation, hydrofining and the like can also be conducted with the catalysts of the present invention composited with platinum, chromia, molybdena, tungsten, nickel and the like. The high surface area aluminas can also be employed for aromatization in combination with platinum, zinc oxide and the like. Hydrodesulfurization can also be effected in the presence of the high surface area aluminas of the present invention in conjunction with cobalt-molybdenum oxide, sulfides of nickel, tungsten and the like. Oxyorganic compounds can be hydrogenated or dehydrogenated in the presence of high surface area aluminas and copper. Zinc oxide, chromia, copper and the like composited with the high surface area aluminas of the present invention can be employed for methanol synthesis. Catalytic cracking can be effected with the high surface area aluminas employing, as additives or promoters, the oxides of silicon, boron, titanium, zirconium or magnesium. Also crystalline zeolites can be composited with said high surface area aluminas for catalytic cracking. Palladium or manganese oxides composited with the high surface area aluminas are useful in hydrocracking. When silver, copper, manganese or other oxides are composited with the high surface area aluminas, an excellent oxidation catalyst is afforded. Alkylation, isomerization or polymerization of hydrocarbons can be effected employing the high surface area alumina catalyst of the present invention in combination with silica, clays, aluminum chloride, zeolites (both crystalline and amorphous), zinc chloride, phosphoric acid and the like.

The high surface area aluminas of the present invention when employed alone or in combination in the manner described hereinabove can be additionally composited with less than about 10% of other oxides such as silicon dioxide, magnesium oxide, calcium oxide and the like to improve the stability thereof or to modify surface area, pore volume, pore diameter distribution and other physical characteristics.

A preferred catalyst system comprises the high surface area aluminas of the present invention composited with crystalline alumino-silicate zeolites. Although a wide variety of zeolites can be employed in this manner, they are generally characterized by the following chemical formula in the anhydrous form expressed in terms of moles:

$$0.9 \pm 0.2 M_{2/n}O \cdot Al_2O_3 \cdot XSiO_2$$

In the above formula, M is selected from the group consisting of metal cations and hydrogen, $n$ is the valence of M, and $x$ is a number in the range of from about 1 to about 10. Most useful are those zeolites in which $x$ is in the range of from about 3 to about 6.5. Usually, the zeolite, as prepared, contains a substantial proportion of an alkali metal as M in the above formula. Preferred crystalline zeolites are base-exchanged so that the alkali metal oxide, e.g., sodium, represents a minor molar proportion of the metal represented as M. Preferably, the sodium content is reduced below about 10 wt. % based on the zeolite, more preferably below about 5 wt. %.

Crystalline alumino-silicate zeolites having uniform pore openings in the range of from about 3A to about 15A and varying silica to alumina ratios can be prepared by any of the methods known in the art, which involve the reaction of the proper amounts and ratios of silica, alumina and sodium hydroxide. The alumina can be employed in the preparation either directly or in the form of sodium aluminate or an alumina sole or the like, the silica can be supplied in the form of sodium silicate and/or silica gel and/or a silica sol, an alkali may be furnished by an alkaline hydroxide, as for example sodium hydroxide, either as such or in combination with sodium aluminate and/or sodium silicate. As taught in the prior art, careful control should be kept over the pH, the sodium ion concentration of the mix and the crystallization. Suitable processes for preparing molecular sieves in this manner are described for example, in U.S. Pat. Nos. 2,882,244 and 2,971,904.

The most common means for removing sodium from the crystalline zeolite is by base exchange with suitable cation solutions. The zeolite can be exchanged with hydrogen-containing cations and cations of metals in Groups I to VIII and rare earth metals, preferably metals in Groups II, III, IV, V, VI-B, VII-B, VIII and the rare earth metals. More than one cation can be introduced by successive exchange treatment. Particularly preferred cations are hydrogen or hydrogen-containing cations, e.g., ammonium ion, and/or magnesium cations. Examples of other suitable cations are cobalt, nickel, zinc, magnesium, strontium, calcium, cadmium, copper and barium cations. The base exchange is accomplished by conventional contact of the crystalline zeolite with a suitable salt solution of the desired cation, such as the sulfate, chloride, nitrate and the like.

A preferred catalyst is a low soda ($Na_2O$) faujasite zeolite which has been composited with a high surface area alumina of the present invention. Preferably, the low soda faujasite catalyst exhibits a soda content of less than about 1 wt. %. To obtain this low soda content, the faujasite catalyst can be exchanged with ammonium ions in, for example, ammonium salt solutions. Thereafter, the resultant zeolite can be subjected to steam treatment at temperatures of from about 600° to about 1400° F., followed by further exchange such as with ammonium salt solutions, thereby producing a final catalyst exhibiting a soda content of less than about 1 wt. %. Catalysts prepared in this manner exhibit a high silica content and high steam stability.

The base-exchanged crystalline zeolite can be further composited with a Group VIII metal by treatment with a solution of a Group VIII metal salt or ammonium complex, e.g., ammonium chloro-platinate, ammoniacal palladium chloride and the like. The amount of Group VIII metal in the final catalyst is generally bebetween about 0.01 and about 5.0 wt. %, preferably 0.1 to 3.0 wt. % based on the zeolite. Group VIII metals are those metals appearing in Group VIII of the Periodic Table of the Elements and include, for example, iron, cobalt, nickel, ruthenium, rhodium, palladium, osmium, iridium, and platinum as well as mixtures thereof.

As an additional step in the preparations of the composited crystalline zeolite catalyst of the present invention, the catalyst either in its original form, or after base exchange or after impregnation with a Group VIII metal is subjected to calcination at a temperature of from about 400° F. to about 1000° F. for several hours. For example, calcination can be effected by two hours heating at 400° F. followed by four hours at 550° F. followed by sixteen hours at 1000° F.

If desired, the added catalytic components can be combinations such as the multiple component, non-noble metal adducts of zeolite cations with oxy or thio-compounds containing Group V and VII-B elements in the anionic form.

Although generally, low alkaline metal content is preferred, steam regeneration of the catalyst can be improved by inclusion of an alkaline metal therein. Frequently, the residual alkaline content of the zeolite catalyst is sufficient to achieve this promotional effect. This is generally the case, for example, with erionite catalysts wherein the potassium ion is not completely removed. However, to achieve such promotional effects, the catalysts can be composited with additional alkaline material such as potassium, cesium, and the like by a limited exchange.

The following examples further define, describe and compare methods of preparing the high surface area aluminas of the present invention and of utilizing them in catalytic hydrocarbon conversion processes. Parts and percentages are by weight unless otherwise indicated.

EXAMPLE I

Approximately 225 grams of anhydrous $AlCl_3$ was placed in a 500 ml. long-neck Kjeldahl flask and ammonia gas was passed into the flask at room temperature through a glass tube extending almost to the bottom. The heat of reaction on continued $NH_3$ addition (0.7 – 1.0 mole $NH_3$/mole $AlCl_3$) resulted in liquefaction but as the reaction proceeded the products tended to solidify. The flask and contents were then heated in a crucible-type furnace to 500° F. as the flow of $NH_3$ was continued. Sublimate from the neck of the flask was picked up in a stream of dry air and collected in a filter system for subsequent hydrolysis. Other aluminum chloride-ammonia complexes were prepared in a similar way at 600°, 650°, and 850° F. Analysis of the ammoniate formed at 650° F. had a composition corresponding to 4.5 moles $NH_3$/mole $AlCl_3$.

Hydrolysis of the above aluminum chloride polyammoniates was effected by vigorously stirring 80 grams of the powdered material into one liter of water. The $Al_2O_3$ was washed free of chloride ion and dried under vacuum to 300° F. The following table summarizes surface area data obtained on the four alumina preparations.

TABLE 1

| Sample No. | Ammoniate Formation Temp., °F. | Surface Area of $Al_2O_3$, $M^2$/g. |
|---|---|---|
| 1 | 500 | 363 |
| 2 | 600 | 490 |
| 3 | 650 | 474 |
| 4 | 850 | 439 |

The initial ammoniate formed at about one mole $NH_3$/mole $AlCl_3$ or less was completely soluble in water and did not hydrolyze to form $Al_2O_3$.

EXAMPLE II

Aluminum chloride ammoniate was prepared as in Example I at 650° F. with an $NH_3/AlCl_3$ molar ratio of 4.8. Portions of this ammoniate were hydrolyzed under three different conditions: (a) no adjustment of pH, (b) pH maintained at 9 with $NH_4OH$, and (c) pH maintained at 9 with $NH_4OH$ in 0.3 molar ammonium acetate. The effects of these variations are summarized in the following Table and show the beneficial effects of maintaining the pH of the hydrolysis solution at about 9 or above.

TABLE 2

| Preparation Number | Hydrolysis Solution | | Surface Area ($M^2$/g) of $Al_2O_3$ Calcined to 800° F. |
|---|---|---|---|
| | pH | Additive | |
| 5 | 9–8.5 | none | 319 |
| 6 | 9 | $NH_4OH$ | 399 |
| 7 | 9 | $NH_4OH$ + ammonium acetate to 0.3 molar | 429 |

EXAMPLE III

A silica-containing $Al_2O_3$, useful as a catalyst or as a base or supporting material in various catalysts, was prepared from aluminum chloride polyammoniate as follows. The ammoniate was obtained as in Example I at 800° F. and had an $NH_3/AlCl_3$ molar ratio of 3.6. Fifty grams of the ammoniate was hydrolyzed by slow addition to 500 ml. of water to which 3.1 g. of Ludox (42% $SiO_2$) had been added. The alumina was washed with demineralized water, oven dried, and then calcined. The $SiO_2$ content of the calcined material was 3.3 wt. %.

EXAMPLE IV

A $CoO$-$MoO_3$-$Al_2O_3$ desulfurization catalyst was prepared from $Al_2O_3$ derived from aluminum chloride polyammoniate. The ammoniate, prepared as in Example I at 700° F. with an $NH_3/AlCl_3$ molar ratio of 3.9, was hydrolyzed as in Example II, Preparation 7. The $Al_2O_3$ was washed free of chloride ions and dried. Five hundred sixty grams of the 250° F. oven dried alumina (25.3% volatiles) was impregnated with a solution of 57.6 grams of cobalt acetate tetrahydrate in 680 ml. $H_2O$. The cobalt-impregnated alumina was oven dried at 250° F. and was the re-impregnated with a solution of 73.2 g. of ammonium molybdate in 600 ml. $H_2O$. The composition of the calcined water-free preparation was 3.5% $CoO$-12.0% $MoO_3$-$Al_2O_3$. The 800° F. calcined material had a surface area of 440 $M^2$/g., a pore volume of 0.55, and a 4 V/S of 50A (pore diameter). The utility of this catalyst for desulfurization of petroleum fractions was demonstrated with gas oil and residuum feed sticks.

Although specific materials and conditions were set forth in the above exemplary process in making and using the high surface area aluminas of the present invention, there are merely intended as illustrations of the present invention.

Other modifications of the present invention will occur to those skilled in the art upon a reading of the present disclosure. These are intended to be included within the scope of this invention.

What is claimed is:

1. Process for preparing high surface area aluminas comprising reacting substantially anhydrous aluminum chloride with ammonia at temperatures ranging from about 100° to about 900° F. to form an aluminum chloride-ammonia complex comprising aluminum chloride polyammoniates having a composition corresponding to 3–6 moles $NH_3$/mole $AlCl_3$, and hydrolyzing said polyammoniates to obtain high surface area alumina.

2. Process as defined in claim 1 wherein the aluminum chloride-ammonia complex is heated to temperatures of from about 500° F. to about 900° F. prior to hydrolysis of said complex.

3. Process as defined in claim 1 wherein said complex is purified by distillation or sublimation prior to hydrolysis.

4. Process as defined in claim 1 wherein the polyammoniates are hydrolyzed in a hydrolysis solution exhibiting a pH of at least about 9.

5. Process as defined in claim 1 wherein the resulting alumina is washed to substantially remove any residual chloride ion.

* * * * *